United States Patent
Huffman et al.

(10) Patent No.: US 6,948,754 B2
(45) Date of Patent: Sep. 27, 2005

(54) SLIDE-OUT OPERATING MECHANISM

(75) Inventors: Timothy J. Huffman, Pendleton, OR (US); Thomas H. Kessler, Eugene, OR (US); William H. Benetreu, Junction City, OR (US)

(73) Assignee: Actuant Corporation, Milwaukee, WI (US)

( * ) Notice: Subject to any disclaimer, the term of this patent is extended or adjusted under 35 U.S.C. 154(b) by 0 days.

(21) Appl. No.: 10/682,753

(22) Filed: Oct. 9, 2003

(65) Prior Publication Data

US 2004/0124651 A1 Jul. 1, 2004

Related U.S. Application Data

(60) Provisional application No. 60/418,043, filed on Oct. 11, 2002.

(51) Int. Cl.$^7$ .................................................. B60P 3/34
(52) U.S. Cl. ..................................... 296/26.13; 296/176
(58) Field of Search .......................... 296/26.12, 26.13, 296/165, 172, 176

(56) References Cited

U.S. PATENT DOCUMENTS

| | | | |
|---|---|---|---|
| 5,237,782 A | 8/1993 | Cooper | |
| 5,332,276 A | 7/1994 | Blodgett, Jr. | |
| 5,333,420 A | 8/1994 | Eden | |
| 5,758,918 A | 6/1998 | Schneider et al. | |
| 5,902,001 A | * 5/1999 | Schneider | ................ 296/26.13 |
| 6,116,671 A | 9/2000 | Schneider | |
| 6,305,739 B1 | * 10/2001 | Corona | ........................ 296/165 |
| 6,494,518 B2 | * 12/2002 | Kreil et al. | ............... 296/26.13 |
| 6,601,896 B1 | 8/2003 | Nye et al. | |
| 2003/0205911 A1 | * 11/2003 | Schneider | .................... 296/175 |

OTHER PUBLICATIONS

Barker Manufacturing Co. drawing entitled Rollout Rack Drive, Jan. 4, 1994.

\* cited by examiner

*Primary Examiner*—Jason Morrow
(74) *Attorney, Agent, or Firm*—Quarles & Brady LLP

(57) ABSTRACT

An operating mechanism for selectively extending and retracting a slide-out section of a vehicle. The mechanism includes a vertically extending support member fixable relative to a vehicle body. The support member having an upper edge. At least one pair of rollers are rotatably mounted to the support member. Each roller of the at least one pair of rollers have a radially outwardly facing surface, and at least a portion of the radially outwardly facing surface extends above the support member upper edge. A rail member for supporting the slide-out section engages the at least one pair of rollers for slidable movement between an extended position and a retracted position.

21 Claims, 5 Drawing Sheets

FIG. 3
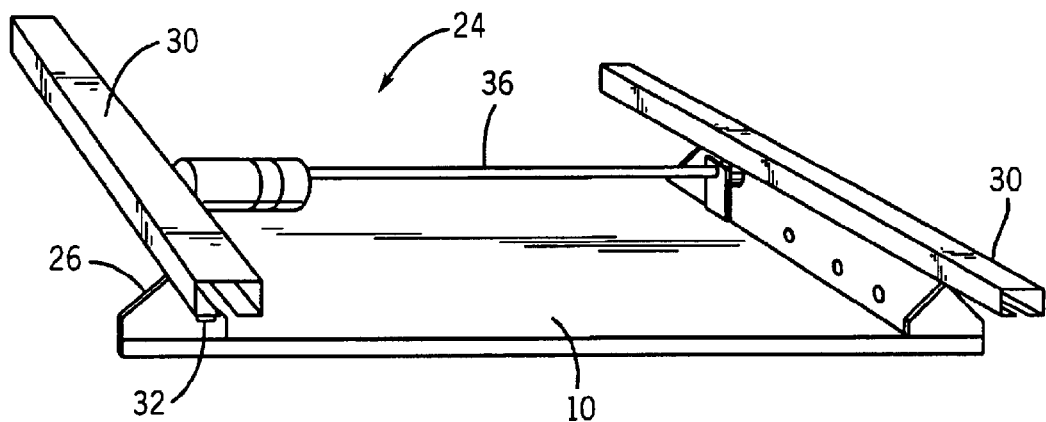
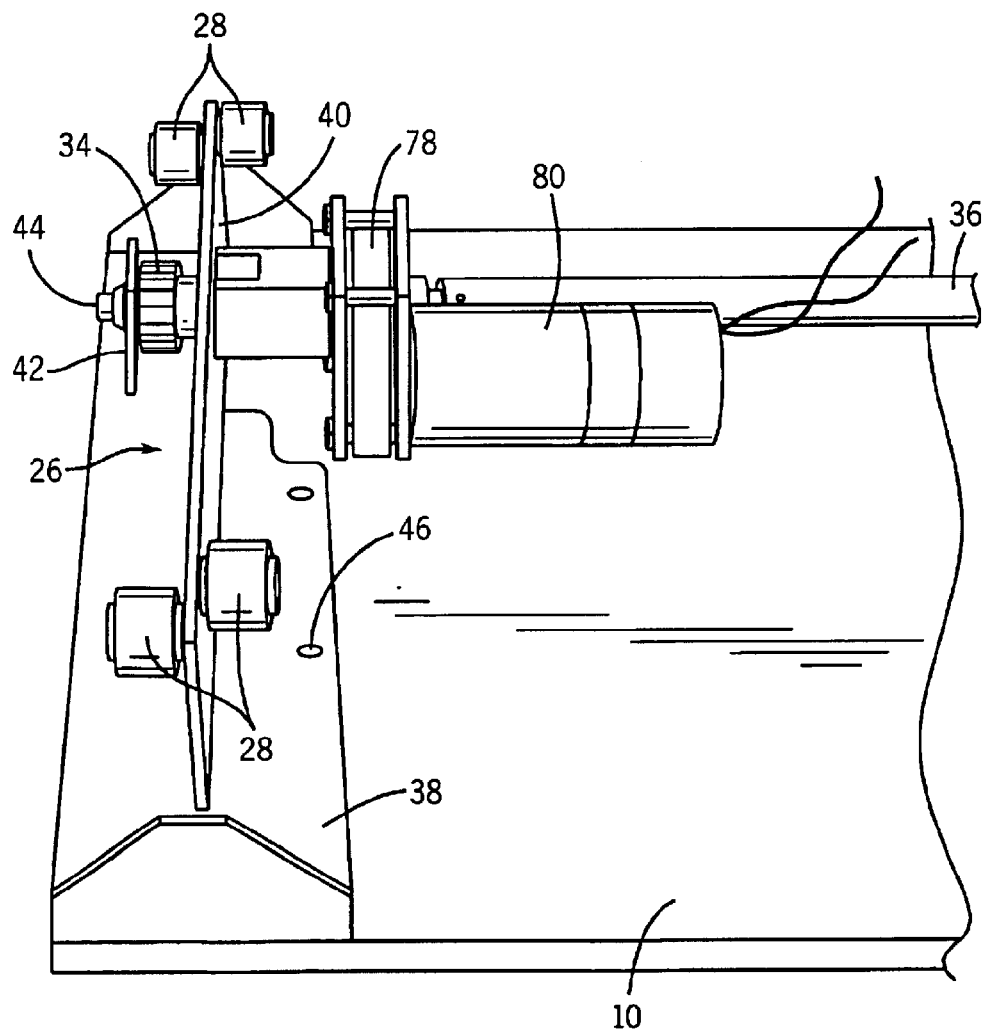
FIG. 5

SLIDE-OUT OPERATING MECHANISM

CROSS REFERENCES TO RELATED APPLICATIONS

This application claims the priority benefit of U.S. Provisional Patent Application No. 60/418,043 filed on Oct. 11, 2002.

STATEMENT REGARDING FEDERALLY SPONSORED RESEARCH

Not Applicable.

BACKGROUND OF THE INVENTION

In order to increase the available interior space of recreational vehicles or trailers, slide-out rooms or sections can be made integral with the structure of the vehicle or trailer. During transit, these rooms can be retracted and stored in the interior of the vehicle or trailer, with the exterior wall of the slide-out room approximately flush with the exterior of the vehicle or trailer. To use the slide-out room, the vehicle is first parked and leveled. The slide-out room is then slid outward from the vehicle, increasing the interior space of the vehicle.

A number of motive devices are currently used to extend and retract slide-out rooms. These devices may be hydraulic, pneumatic, electric, simple gearing mechanisms, sheave and pulley arrangements or various combinations thereof. One common type of mechanism used in the prior art for extending or expanding trailer bodies is a motor actuated cable and sheave mechanism such as disclosed in U.S. Pat. No. 5,332,276 issued Jul. 26, 1994 to Blodgett, Jr. Another arrangement for moving a slidable trailer room is a worm gear system driven by an electric motor as set forth in U.S. Pat. No. 5,237,782 issued Aug. 24, 1993 to Cooper. Another slide-out mechanism design which employs a motor actuated rack and pinion drive is shown in U.S. Pat. No. 5,333,420 issued Aug. 2, 1994 to Eden.

While some of the prior art trailer extension and expansion devices have yielded satisfactory results, most have demonstrated a number of shortcomings. For example, in the cable and sheave systems, there is the problem of the cables stretching, causing slippage in the sheave and eventual jamming or binding of the structural members which support the slide-out section. In an attempt to rectify this, some cable and sheave systems require a compression spring mechanism which adds to the overall installation and maintenance costs of this particular type of system. Arrangements employing worm gear operating mechanisms have proven to be unreliable and noisy and are subject to the same types of binding as aforedescribed. In the case of rack and pinion sliding mechanisms, gear assemblies had to be coordinated with corresponding gear racks on each of the sides of the expandable sections. Any misalignment between any of the racks and pinions leads to synchronism problems which can result in the slide-out section becoming skewed or binding during the transit sliding action.

It remains desirable to provide an operating mechanism for a slide-out section of a trailer which is sturdy, reliable, easy, and quietly operated. It is also desirable to provide an operating mechanism which provides smooth, uniform and responsive movement as well as positive locking of a slide-out section. It is also within the purview of the invention to contemplate various drive options for moving the slide-out section back and forth.

SUMMARY OF THE INVENTION

The present invention provides an operating mechanism for selectively extending and retracting a slide-out section of a vehicle. The mechanism includes a vertically extending support member fixable relative to a vehicle body. The support member having an upper edge. At least one pair of rollers are rotatably mounted to the support member. Each roller of the at least one pair of rollers have a radially outwardly facing surface, and at least a portion of the radially outwardly facing surface extends above the support member upper edge. A rail member for supporting the slide-out section engages the at least one pair of rollers for slidable movement between an extended position and a retracted position. In one embodiment of the invention, a rack is fixed to the rail member, and a pinion engages the rack for driving the rail member between the extended position and the retracted position.

A general objective of the present invention is an improved operating mechanism for a vehicle slide-out section. This objective is accomplished by providing an operating mechanism having a rail member which straddles a support member and/or encloses the rollers.

This and still other objectives and advantages of the present invention will be apparent from the description which follows. In the detailed description below, preferred embodiments of the invention will be described in reference to the accompanying drawings. These embodiments do not represent the full scope of the invention. Rather the invention may be employed in other embodiments. Reference should therefore be made to the claims herein for interpreting the breadth of the invention.

BRIEF DESCRIPTION OF THE DRAWINGS

FIG. 3 is a perspective view of a vehicle room slide-out operating mechanism embodying the present invention;

FIG. 5 is a perspective view of the operating mechanism of FIG. 3 with the rail member removed;

DETAILED DESCRIPTION OF THE INVENTION

The present invention provides an expandable section attached to a known trailer or recreational vehicle which provides distinct advantages over the prior art as will be described and appreciated hereafter. In the preferred embodiment, the trailer or recreational vehicle (generally referred to as the vehicle) is equipped with a laterally adjustable wing or slide-out section used to provide additional interior room. However, it should be understood that the invention can also apply to expandable sections or compartments provided on other vehicles for use in construction, military, medical, education, mobile broadcast and other applications to expand the inside volume of the vehicle.

Figure 1:
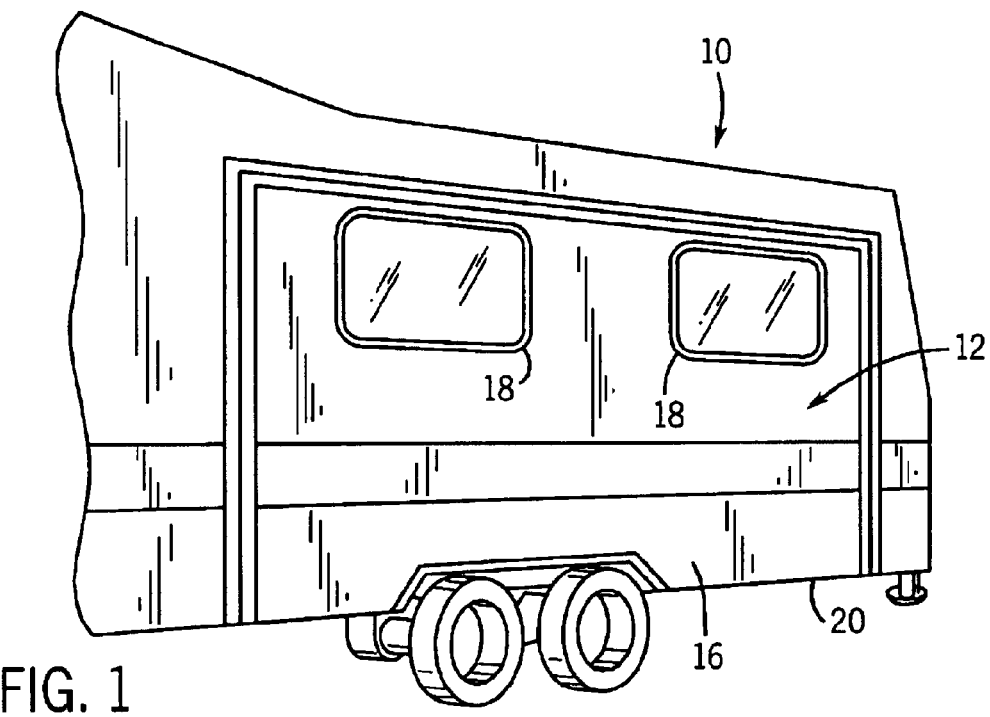
FIG. 1 is a partial, perspective view of a retracted slide-out section of a trailer or recreational vehicle utilizing the slide-out operating mechanism of the present invention.
Figure 2:
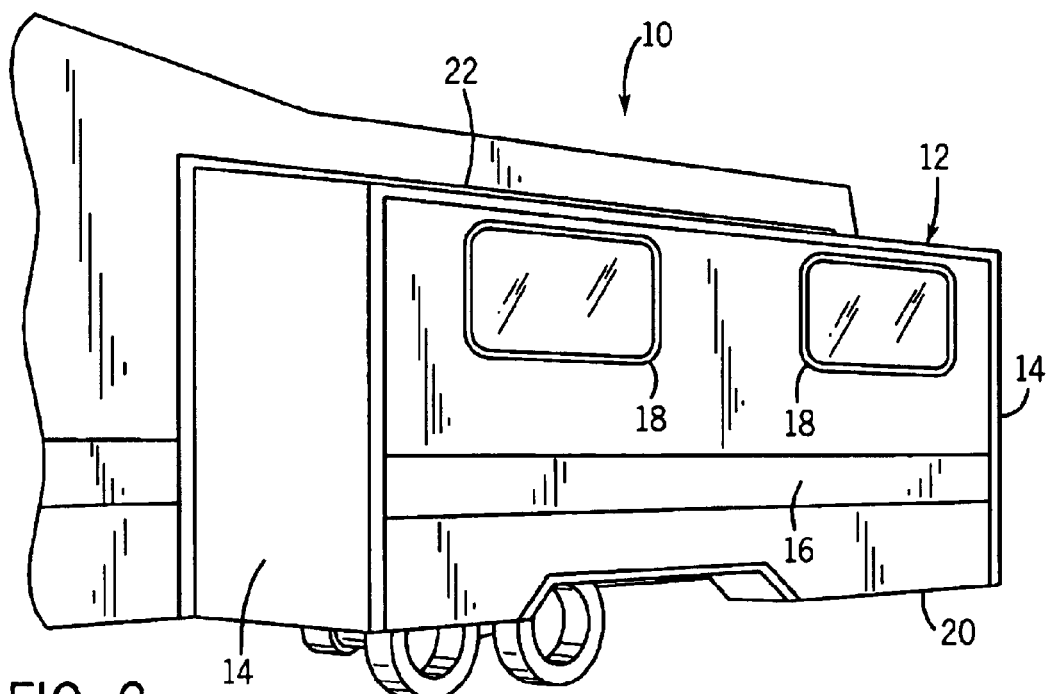
FIG. 2 is a partial, perspective view of the expanded slide-out section of the trailer or recreational vehicle of FIG. 1.

Referring now to the drawings, FIG. 1 illustrates a side perspective view of a vehicle body 10 having mounted thereon an expandable, telescopic slide-out section 12 of the present invention in its fully retracted position. FIG. 2 is a similar view with the slide-out section 12 fully extended. Slide-out section 12 is rectangularly configured and includes a pair of side walls 14, a front wall 16 with two windows 18, a bottom wall 20 and a roof 22. An arrangement for supporting and controlling the slide-out section 12 is adapted to be mounted beneath the vehicle body 10 in the following manner, primary reference being made to FIG. 3.

Referring to FIGS. 3–7, an operating mechanism 24 for selectively extending and retracting the slide-out section 12 of the vehicle body 10 includes a vertically extending support member 26 fixed to the vehicle body 10. Two pairs of staggered rollers 28 are rotatably mounted to the support member 26, and support a rail member 30. The rail member 30 engages the rollers 28 for slidable movement between an extended position and a retracted position, and supports the slide-out section 12. A toothed rack 32 is fixed to the rail member 30, and a rotatably driven pinion 34 engages the rack 32 to drive the rail member 30, and thus the slide-out section 12, between the extended position and said retracted position. Preferably, the operating mechanism 24 includes a pair of parallel rail members 30 mechanically linked by a rotatable shaft 36 to simultaneously move between the extended position and said retracted position.

Figure 4:
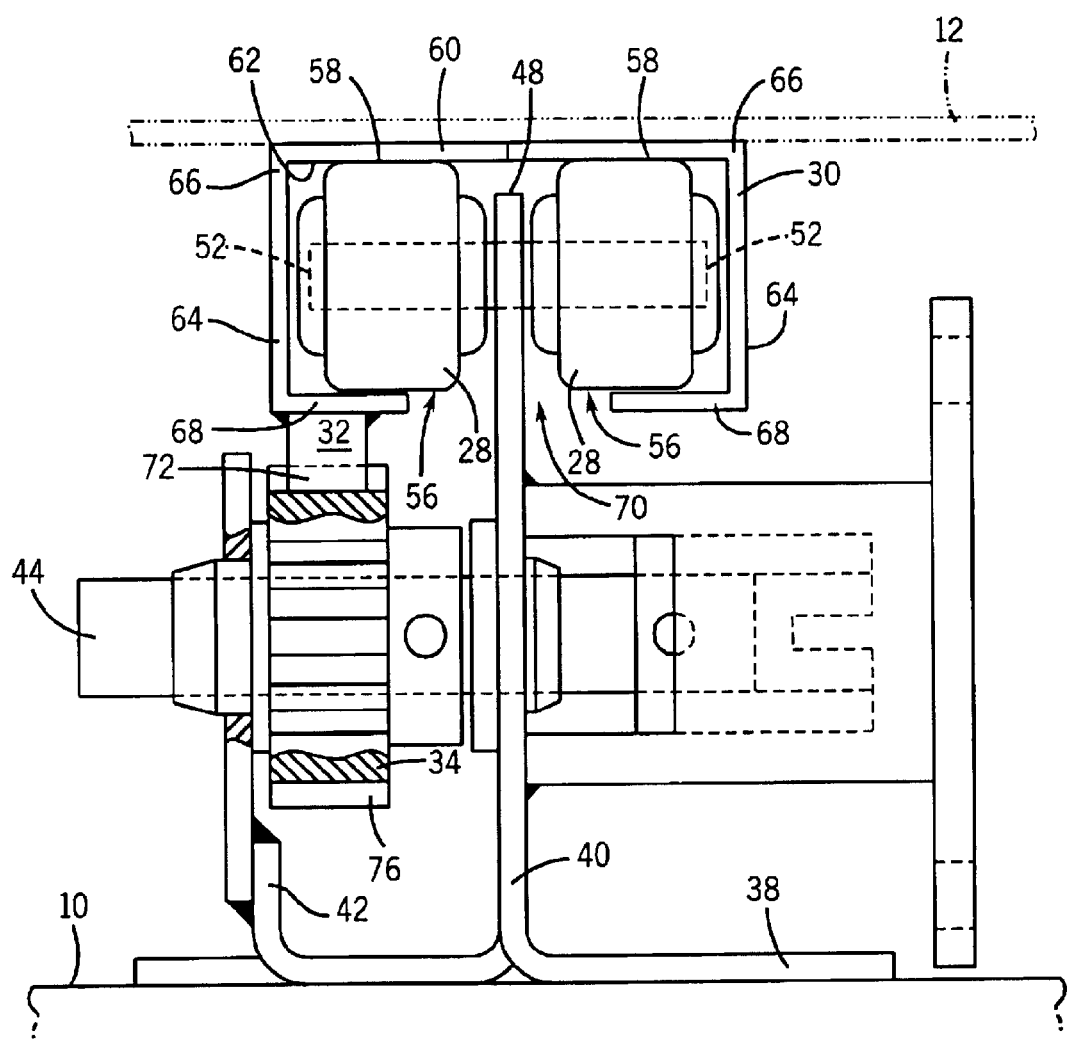
FIG. 4 is an end view of the operating mechanism of FIG. 3.

As shown in FIGS. 4 and 5, the support member 26 includes a base 38 which is rigidly fixed to the vehicle body 10. A wall 40 extends vertically from the base 38 for mounting the rollers 28 thereon. A bracket 42 fixed relative to the wall 40 can be provided to support a pinion shaft 44 extending through the wall 40. Preferably, holes are formed in the base 38 for receiving bolts (not shown) to bolt the base to the vehicle body 10. Although bolting the base 38 to the vehicle body 10 is preferred, other methods for fixing the support member to the vehicle body can be used, such as welding, clamping, and the like, without departing from the scope of the invention.

The vertical wall 40 defines a longitudinal axis aligned with the direction of travel of the rail member 30. Preferably, the wall 40 and base 38 are formed as a single piece which is bent to form the wall 40 at a right angle to the base 38. Of course, the wall 40 can be joined to the base using methods known in the art, such as by using fasteners, brackets, welding, and the like without departing from the scope of the invention. Although the wall 40 preferably extends the entire length of the base to provide a structurally sound support member, the vertical wall 40 can comprise disconnected support walls extending vertically from the base, or the vehicle body 10 if a base is not provided, along the longitudinal axis to support individual rollers.

Figure 6:
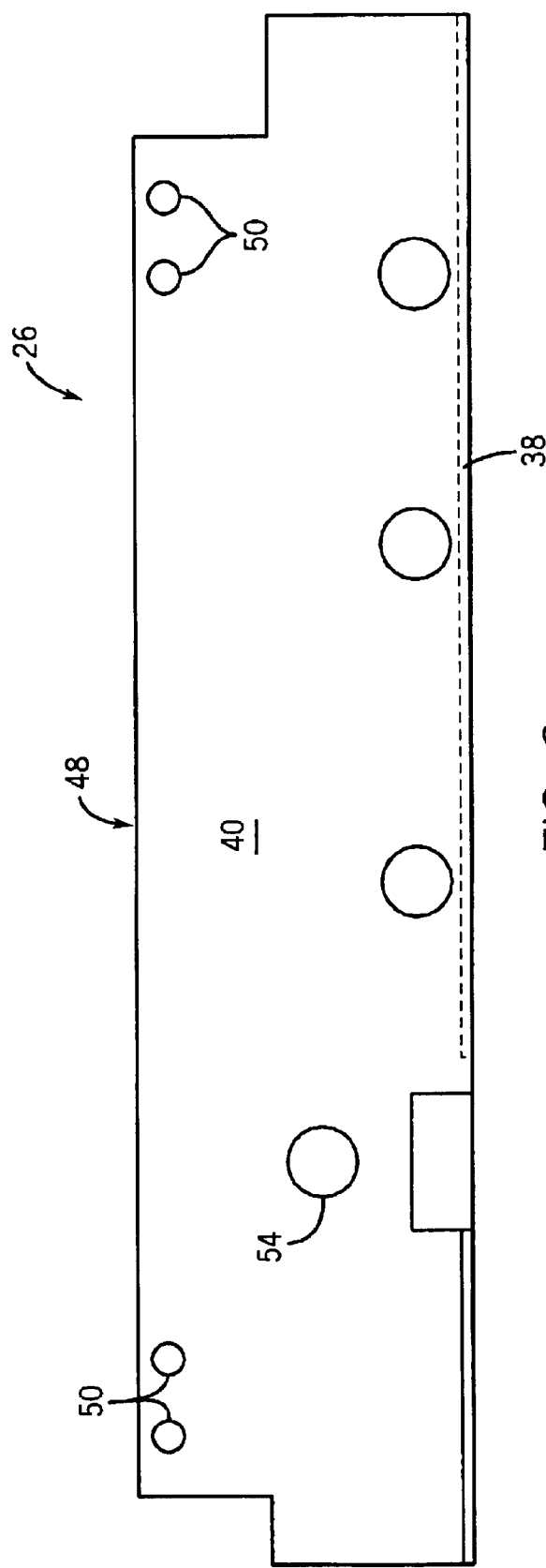
FIG. 6 is a elevation view of the vertical wall of the support member of the operating mechanism of FIG. 3.
Figure 7:
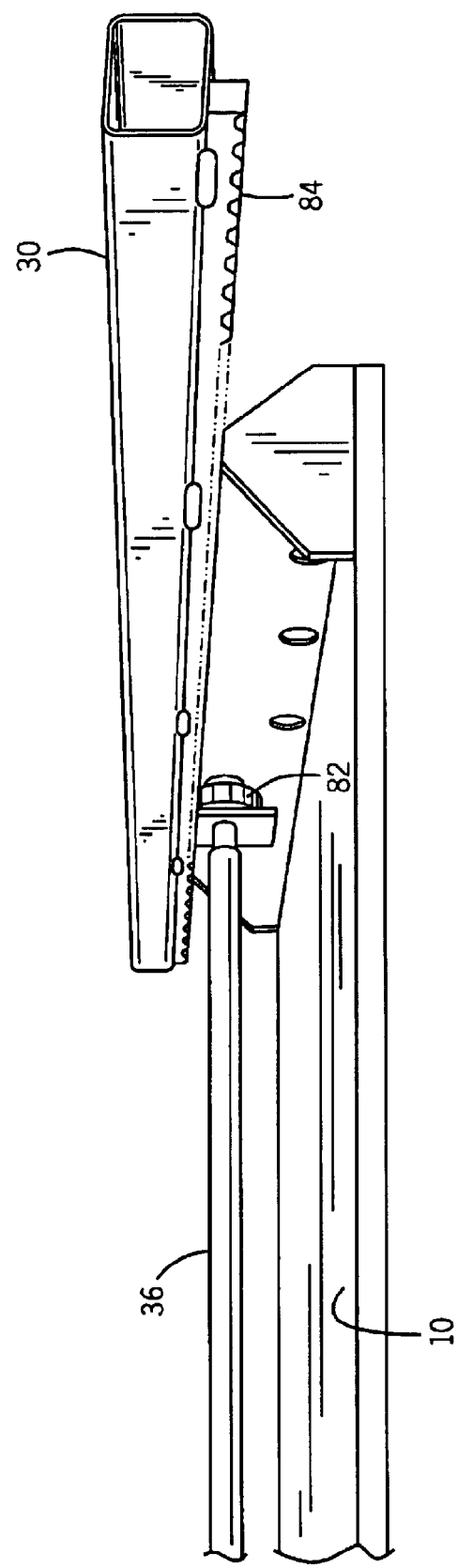
FIG. 7 is a perspective view of a second, parallel operating mechanism linked to the first operating mechanism.

Referring to FIG. 6, the vertical wall 40 includes a top edge 48 above which is disposed the slide-out section 12. A pair of roller shaft holes 50 formed at each end of the wall 40 are spaced a distance less than the radius of the rollers 28 from the top edge 48. Each roller shaft hole 50 receives a roller shaft 52 (shown in FIG. 4) to rotatably mount one of the rollers 28 proximal the vertical wall top edge 48 on one side of the wall 40. Preferably, each roller 28 of a pair of rollers 28 is mounted on opposite sides of the wall 40. Although forming holes in the vertical wall for mounting the rollers thereto is preferred, the rollers can be rotatably mounted to the vertical wall using other methods known in the art, such as by brackets, and the like without departing from the scope of the invention. The pinion shaft 44 extends through a pinion shaft hole 54 formed in the wall 40 and spaced below the roller shaft holes 50.

As shown in FIGS. 4 and 5, the staggered rollers 28 are substantially identical, and are each independently and freely rotatable about an axis of rotation defined by its respective roller shaft 52. Each roller 28 includes a radially outwardly facing circumferential surface 56 which defines the roller diameter. A portion 58 of the outwardly facing surface 56 of each roller 28 extends above the support member vertical wall top edge 48 to engage the rail member 30 above the vertical wall 40 and support the rail member 30.

The rail member 30 supports the slide-out section 12, and is, preferably, a slotted box channel supported by the rollers 28 surrounded by the rail member 30. Advantageously, the rail member 30 covers and, preferably, encloses the rollers 28 to protect them from the environment and contaminants which can degrade the performance of the operating mechanism and increase maintenance requirements. The slide-out section 12 is fixed to the rail member 30 using methods known in the art, such as brackets, bolting, welding, and the like without departing from the scope of the invention.

The C-shaped rail member 30 includes a top wall 60 which straddles the support member vertical wall 40, and has a downwardly facing surface 62 which engages the rollers 28. A pair of legs 64 extend downwardly from each longitudinal edge 66 of the top wall 60. Each leg 64 extends past the rollers 28 on opposing sides of the support member vertical wall 40. A tab 68 joined to a bottom edge of each leg 64 extends inwardly toward the support vertical wall 40 to define a longitudinal slot 70 in the rail member 30. Each tab 68 extends beneath and is engageable with the rollers 28 on one side of the vertical wall 40. Advantageously, the vertical distance between the top wall and tab is greater than the roller diameter, such that the top wall and tab cannot engage any single roller at the same time and impede rotation of the roller.

The rail member 30 is driven by the pinion 34 which engages the rack 32 fixed to the rail member 30. Preferably, the rack 32 includes a plurality of downwardly depending teeth 72, and is fixed to a downwardly facing surface 74 of one of the tabs 68. The rack 32 is rigidly fixed to the tab 68 using methods known in the art, such as welding, bolting, and the like. Of course, the rack could be formed as an integral part of the tab by forming teeth in the tab or a plurality of evenly spaced apertures which are engageable with a pinion. Although the rack is disclosed as being fixed to one of the tabs, the rack can be fixed to any part of the rail member, such as the top wall or one of the legs without departing from the scope of the invention.

In the embodiment disclosed herein, the rotatably driven pinion 34 has radially outwardly extending teeth 76 which engage the rack teeth 72 to drive the rail member 30 between the extended position and the retracted position. The pinion 34 is mounted on the pinion shaft 44 which is rotatably driven by a gearbox 78. The gearbox 78 is driven by an electric motor 80. The gearbox 78 and motor 80 are known in the art.

Preferably, the gearbox 78 also rotatably drives the shaft 36 which rotatably drives a second pinion 82. The second pinion 82 engages a rack 84 fixed to the second rail member 30 parallel to the first rail member 30. The second pinion 82 drives the second rail member 30, such that the second rail member 30 moves simultaneously with the first rail member 30. Preferably, the second rail member 30 is supported by rollers mounted to a support, as described above. Although an operating mechanism including parallel second rail member is preferred, the a parallel second rail member is not required to practice the invention.

While there has been shown and described what are at present considered the preferred embodiments of the invention, it will be obvious to those skilled in the art that various changes and modifications can be made therein without departing from the scope of the invention defined by the appended claims.

We claim:

1. An operating mechanism for selectively extending and retracting a slide-out section of a vehicle, said mechanism comprising:
    a vertically extending wall fixable relative to a vehicle body, said wall having an upper edge and opposing sides;
    at least one pair of rollers rotatably mounted to said wall, each roller of said at least one pair of rollers having a radially outwardly facing surface, and at least a portion of said radially outwardly facing surface extending above said wall upper edge, one of said rollers of said at least one pair of rollers being mounted to one of said sides of said opposing sides, and the other of said rollers of said at least one pair of rollers being mounted to the other of said sides of said opposing sides; and
    a rail member for supporting the slide-out section, said rail member straddling said vertically extending wall and engaging said at least one pair of rollers for slidable movement between an extended position and a retracted position, said rail member having an upper wall engaging said radially outwardly facing surface of at least one of said rollers of said pair of rollers.

2. The operating mechanism as in claim 1, in which said rail member includes a bottom wall joined to said upper wall by side walls, and said vertically extending wall extends through a longitudinal slot formed in said bottom wall.

3. The operating mechanism as in claim 1, including a second rail member parallel to said first rail member is mounted for slidable movement between an extended position and a retracted position.

4. The operating mechanism as in claim 3, in which said first rail member is driven by a pinion, and a shaft rotatably synchronized with said pinion rotatably drives a second pinion driving said second rail member.

5. The operating mechanism as in claim 1, in which said at least one pair of rollers are enclosed in said rail member.

6. The operating mechanism as in claim 1, in which said at least one pair of rollers are staggered in the direction of travel of said rail member.

7. The operating mechanism as in claim 1, in which at least one pair of rollers is mounted at each end of said vertically extending wall.

8. The operating mechanism as in claim 1, including a toothed rack fixed to an outer surface of said rail member; and a pinion engaging said rack for driving said rail member between the extended position and said retracted position.

9. An operating mechanism for selectively extending and retracting a slide-out section of a vehicle, said mechanism comprising:
    a vertically extending support member fixable relative to a vehicle body, said support member having an upper edge;
    at least one pair of rollers rotatably mounted to said support member;
    a rail member supported above said vertically extending support member by said at least one pair of rollers and moveable between an extended position and a retracted position, wherein said at least one pair of rollers are staggered in the direction of travel of said rail member; and
    a gear rack secured to an outer surface of said rail member.

10. The operating mechanism as in claim 9, in which said rail member includes an upper wall and a bottom wall joined to said upper wall by side walls, and said vertically extending support member extends through a longitudinal slot formed in said bottom wall.

11. The operating mechanism as in claim 10, including a second rail member parallel to said first rail member is mounted for slidable movement between an extended position and a retracted position.

12. The operating mechanism as in claim 11, in which said first rail member is driven by a pinion engaging said gear rack, and a shaft rotatably synchronized with said pinion rotatably drives a second pinion driving said second rail member.

13. An operating mechanism for selectively extending and retracting a slide-out section of a vehicle, said mechanism comprising:
    a vertically extending support member fixable relative to a vehicle body, said support member having an upper edge;
    at least one pair of rollers rotatably mounted to said support member;
    a rail member supported above said vertically extending support member by said at least one pair of rollers and moveable between an extended position and a retracted position, wherein said at least one pair of rollers are enclosed in said rail member; and
    a gear rack secured to an outer surface of said rail member.

14. The operating mechanism as in claim 13, in which said at least one pair of rollers are mounted on opposite sides of said vertically extending support member.

15. The operating mechanism as in claim 9, in which at least one pair of rollers is mounted at each end of said vertically extending support member.

16. The operating mechanism as in claim 13, including a pinion engaging said gear rack for driving said rail member between the extended position and said retracted position.

17. The operating mechanism as in claim 9, in which said at least one pair of rollers are rotatably mounted to a single support member, and said rail member straddles said single vertically extending support member.

18. An operating mechanism for selectively extending and retracting a slide-out section of a vehicle, said mechanism comprising:

a vertically extending support member fixable relative to a vehicle body, said support member having an upper edge;

at least one pair of rollers rotatably mounted to said support member, each roller of said at least one pair of rollers having a radially outwardly facing surface, one of said rollers being on one side of said support member and the other one of said rollers being on an opposite side of said support member;

a rail member for supporting the slide-out section, said rail member straddling said vertically extending support member and engaging said at least one pair of rollers for slidable movement between an extended position and a retracted position, said rail member having an interior surface that engages the radially outwardly facing surface of the rollers; and a gear rack secured to an outer surface of the rail member.

19. The operating mechanism as in claim 18, wherein the rail member is C-shaped with a longitudinal slot, and the support member extends into the rail member through the longitudinal slot.

20. The operating mechanism as in claim 18, said at least one pair of rollers includes a first pair of rollers and a second pair of rollers, and said second pair of rollers is longitudinally spaced from said first pair of rollers.

21. The operating mechanism as in claim 20, further comprising a rack attached to said rail member, and a gear engaging the rack between said first and second pairs of rollers.

* * * * *